United States Patent
Son et al.

(10) Patent No.: US 9,276,675 B2
(45) Date of Patent: Mar. 1, 2016

(54) APPARATUS AND METHOD FOR TRANSFERRING AN OPTICAL SIGNAL IN A WIRELESS VISIBLE LIGHT COMMUNICATION SYSTEM

(75) Inventors: Jae-Seung Son, Suwon-si (KR); Jong-Hoon Ann, Suwon-si (KR); Eun-Tae Won, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1724 days.

(21) Appl. No.: 12/022,443

(22) Filed: Jan. 30, 2008

(65) Prior Publication Data
US 2008/0298811 A1 Dec. 4, 2008

(30) Foreign Application Priority Data
May 30, 2007 (KR) .............. 10-2007-52651

(51) Int. Cl.
*H04J 14/02* (2006.01)
*H04B 10/116* (2013.01)
*H04B 10/114* (2013.01)

(52) U.S. Cl.
CPC .......... *H04B 10/116* (2013.01); *H04B 10/1149* (2013.01)

(58) Field of Classification Search
CPC ................ H04B 10/1149; H04B 10/116
USPC ............................................. 398/172
See application file for complete search history.

(56) References Cited

U.S. PATENT DOCUMENTS

| | | | |
|---|---|---|---|
| 6,785,344 B1 * | 8/2004 | Jiang ............ | H04L 25/062 375/317 |
| 7,140,752 B2 * | 11/2006 | Ashdown .............. | 362/276 |
| 2002/0089726 A1 * | 7/2002 | He et al. ................ | 359/172 |
| 2006/0193634 A1 * | 8/2006 | Wang et al. ............ | 398/118 |
| 2008/0063410 A1 * | 3/2008 | Irie ....................... | 398/182 |

FOREIGN PATENT DOCUMENTS

| | | | | |
|---|---|---|---|---|
| JP | 2004-193908 A | 7/2004 | | |
| JP | 2006-262458 A | 9/2006 | | |
| KR | 10-2000-0025312 A | 5/2000 | | |
| WO | WO 2006/033263 A1 * | 3/2006 | ............ | H04B 10/10 |
| WO | 10-2006-0095495 A | 8/2006 | | |

OTHER PUBLICATIONS

Wikipedia/color, retrieved Aug. 5, 2014, p. 1.*
Kim et al., "Reduction of Cross-Gain Modulation in the Semiconductor Optical Amplifier by Using Wavelength Modulated Signal", IEEE Photonics Technology Letters, vol. 12, No. 10, Oct. 2000.*

* cited by examiner

*Primary Examiner* — Shi K Li
(74) *Attorney, Agent, or Firm* — Jefferson IP Law, LLP (57) ABSTRACT

A wireless visible light communication system is provided. The system includes optical transmitters and optical receivers for receiving optical signals, wherein each of the optical transmitters includes a first light source for generating an optical signal, and at least one light source capable of generating light which has a color equal to that of the optical signal, and has a wavelength different from that of the optical signal.

5 Claims, 8 Drawing Sheets
(1 of 8 Drawing Sheet(s) Filed in Color)

APPARATUS AND METHOD FOR TRANSFERRING AN OPTICAL SIGNAL IN A WIRELESS VISIBLE LIGHT COMMUNICATION SYSTEM

PRIORITY

This application claims the benefit under 35 U.S.C. §119(a) of a Korean patent application filed in the Korean Industrial Property Office on May 30, 2007 and assigned Serial No. 2007-52651, the entire disclosure of which is hereby incorporated by reference.

BACKGROUND OF THE INVENTION

1. Field of the Invention

The present invention relates to an optical communication system. More particularly, the present invention relates to a wireless visible light communication system.

2. Description of the Related Art

The term "optical communication" refers to a communication system for transmitting a data-modulated optical signal through an optical fiber. A benefit of optical communication is that it may be used to transmit a large amount of data at a high speed. Optical communication systems may be classified into a wavelength division multiplexing scheme, a time division multiplexing scheme, a sub-carrier multiplexing scheme, etc. according to an optical signal transmission scheme. The wavelength division multiplexing scheme uses rays of light having different wavelengths as carriers for modulating data.

The wavelength division multiplexing scheme is a type of optical communication method for transmitting optical signals. The optical signals are data modulated into channels (i.e., light) having different wavelengths, through optical lines or the like. Since the wavelength division multiplexing scheme can transmit a plurality of optical signals through a single optical line, the wavelength division multiplexing scheme is an optical communication method suitable for transmission of a large amount of data at a high speed. Moreover, an optical communication system employing the wavelength division multiplexing scheme can transmit different types of data (e.g., Internet data, synchronous optical network (SONET) data, asynchronous transfer mode (ATM) data, etc.) through one optical line.

The wavelength division multiplexing scheme makes it easier to select bands according to wavelengths as compared to the frequency modulation and time division schemes. Therefore, the wavelength division multiplexing scheme can also be applied to wireless optical communication systems. However, the wireless visible light communication system may be restricted to indoor use or ultra short range communication because the wireless visible light communication system uses light as a carrier.

The wireless visible light communication may use light sources capable of generating white light as optical transmitters, or may user light sources capable of generating light of a wavelength which is invisible to the human eye (e.g., infrared ray, etc.).

When the wireless visible light communication system is applied in an indoor environment, optical signals generated from the light sources may additionally function as illumination, and light sources of three colors (red, blue and green) may be used to respectively generate optical signals to be used as carriers so that the optical signals can be at substantially the same state as natural light.

Figure 1:
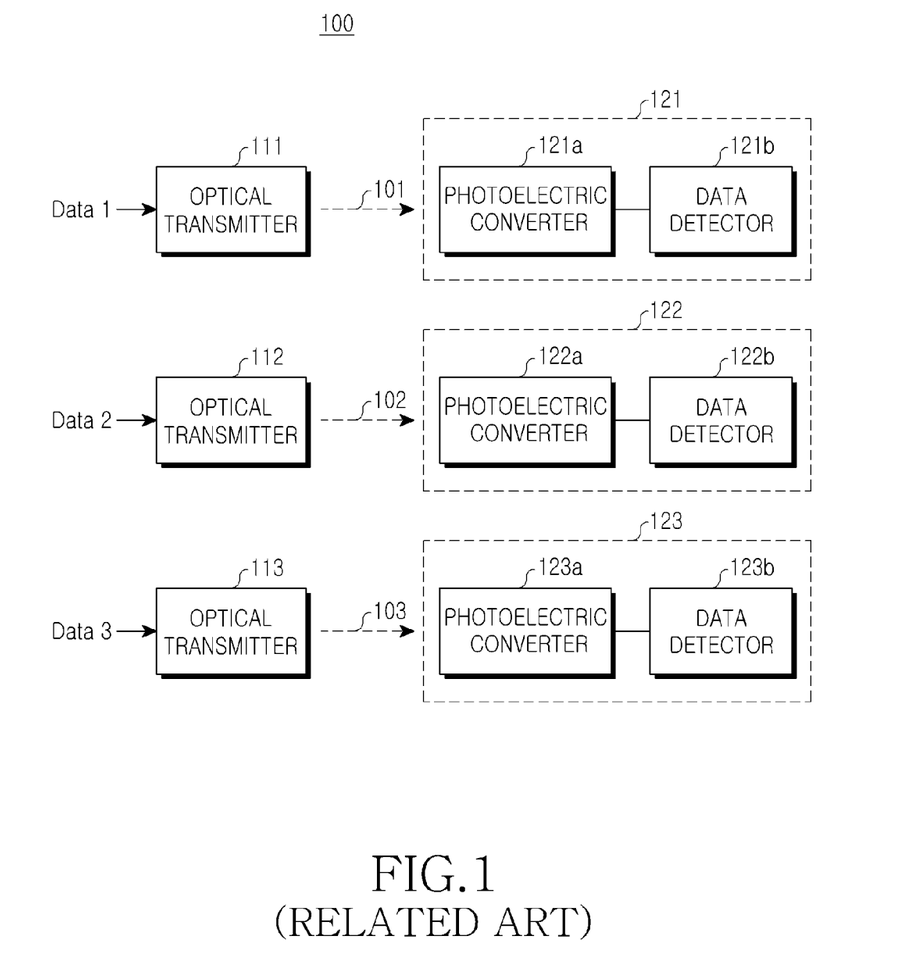
FIG. 1 is a block diagram schematically illustrating a configuration of a conventional wireless visible light communication system.

FIG. 1 is a block diagram schematically illustrating a configuration of a conventional wireless visible light communication system. A wireless visible light communication system 100 is a type of optical communication system which uses optical signals data-modulated using light in a visible wavelength band as a carrier. The wireless visible light communication system 100 includes optical transmitters 111, 112 and 113 capable of generating optical signals 101, 102 and 103 having different colors, and optical receivers 121, 122 and 123 for detecting the optical signals 101, 102 and 103 generated from the optical transmitters 111 to 113.

Each of the optical transmitters 111 to 113 includes light sources capable of generating light having mutually different colors, and may either further include an external modulator for modulating data, or may be configured in such a manner as to directly modulate data using the light sources. Since the wireless visible light communication system uses light in a visible wavelength band, which is visible to the human eye, as a carrier, it is necessary to transmit optical signals in the natural light state so as to minimize fatigue of the user. Accordingly, in an exemplary implementation, the optical transmitters 111 to 113 may be configured with light sources capable of generating three primary colors (red, blue and green) which are mutually different.

The optical receivers 121 to 123 include photoelectric converters 121a to 123a for converting input optical signals at corresponding wavelengths into electrical signals, and data detectors 121b to 123b for detecting data from the electrical signals, respectively.

Photo diodes or phototransistors may be used as the photoelectric converters 121a to 123a. In order to detect an optical signal at a corresponding wavelength, a wavelength selective filter (or a band pass filter or optical filter) for selectively transmitting only the optical signal at a corresponding wavelength from one of the received optical signals may be installed at the front position through which the photoelectric converters 121a to 123a receive the optical signals.

Figure 2:
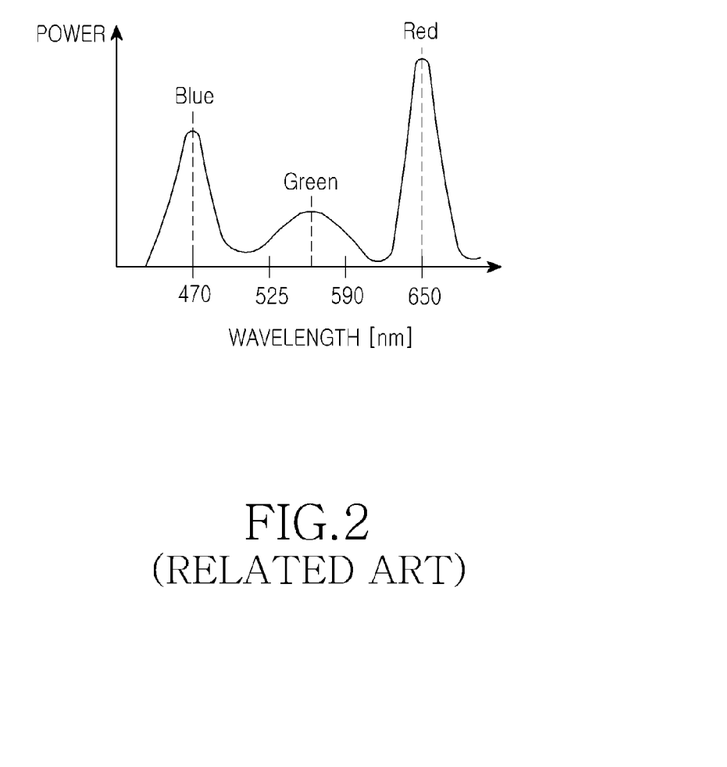
FIG. 2 is a graph illustrating a spectrum of an optical wavelength band used in a conventional wireless visible light communication system.

FIG. 2 is a graph illustrating a spectrum of an optical wavelength band used in a conventional wireless visible light communication system. Referring to FIG. 2, the graph illustrates powers of rays of light according to colors (i.e. green, blue and red). Accordingly, it can be understood that rays of light having colors may have different powers depending on wavelengths.

Although the wireless visible light communication system using light in a visible wavelength band is mainly used in an indoor environment, the wireless visible light communication system has a problem in that it is difficult to produce and maintain light in a uniform state of natural light (white light) due to the characteristic of colored light having different powers depending on wavelengths.

SUMMARY OF THE INVENTION

An aspect of the present invention is to address the above-mentioned problems and/or disadvantages and to provide at least the advantages described below. Accordingly, an aspect of the present invention is to provide a wireless visible light communication system which can uniformly maintain light in a natural light state while using light in a visible wavelength band.

In accordance with an aspect of the present invention, a wireless visible light communication system is provided. The system includes a plurality of optical transmitters capable of generating optical signals having different colors, and a plurality of optical receivers capable of detecting an optical signal which has a corresponding wavelength from one of the optical signals generated by the plurality of optical transmitters, wherein each of the optical transmitters includes a first light source for generating a data-modulated optical signal, and at least one second light source for generating light which has a color equal to that of the optical signal modulated by the first light source, and has a wavelength different from that of the optical signal modulated by the first light source.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

Figure 3:
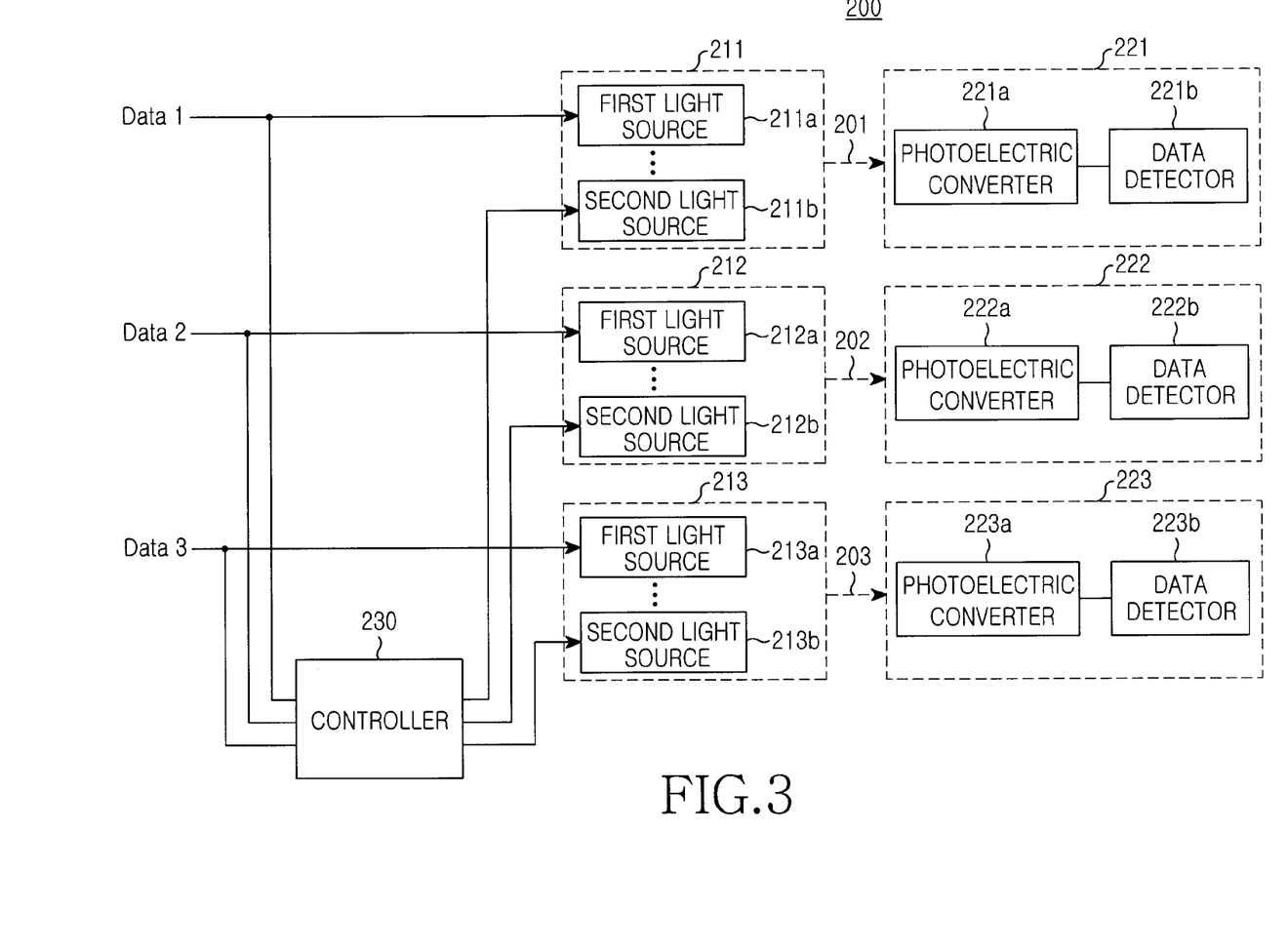
FIG. 3 is a block diagram illustrating a configuration of a wireless visible light communication system according to an exemplary embodiment of the present invention.

FIG. 3 is a block diagram illustrating a configuration of a wireless visible light communication system according to an exemplary embodiment of the present invention. A wireless visible light communication system 200 according to the exemplary embodiment of the present invention includes optical transmitters 211, 212 and 213, optical receivers 221, 222 and 223, and a controller 230.

The optical transmitters 211 to 213 generate optical signals having different colors. Each of the optical transmitters 211 to 213 generates an optical signal having a corresponding color, and additionally generates rays of light which have substantially the same color as the optical signal, and have wavelengths different from that of the optical signal. That is, the optical transmitters 211, 212 and 213 include first light sources 211a, 212a and 213a for generating a data-modulated optical signal and second light sources 211b, 212b and 213b for generating light which has a wavelength different from that of the optical signal generated by the first light sources 211a, 212a and 213a, within a band of substantially the same color as that of the optical signal, respectively.

The wireless visible light communication system 200 uses red, blue and green light as carriers for optical communication in order to transmit/receive optical signals in the natural light state. For example, when the optical transmitter 211a of the optical transmitters 211a to 213a generates a red light signal 201, the other optical transmitters 212a and 213a may generate a blue light signal 202 and a green light signal 203, respectively. The optical transmitters additionally generate rays of light having substantially the same colors as the optical signals 201 to 203 and having wavelengths different from those of the optical signals 201 to 203 such that they can uniformly maintain the light in the natural light state by adjusting a ratio of the powers of the optical signals according to colors.

A light emitting diode or the like, which can generate light having a corresponding color, may be used as the first light sources 211a to 213a. A direct modulation scheme for direct data modulation or an external modulation scheme additionally using a separate external modulator to modulate light generated by the first light sources 211a to 213a may be applied to the first light sources 211a to 213a.

Each of the second light sources 211b to 213b generates light having a corresponding color under the control of the controller, and may include a light emitting diode, or the like, which can generate light having substantially the same color as the optical signal of the corresponding color and having a wavelength different from that of the optical signal.

The optical receivers 221, 222 and 223 include photoelectric converters 221a, 222a and 223a for selecting optical signals at corresponding wavelengths from received light and/or optical signals and converting the selected optical signals into electrical signals. The optical receivers 221, 222 and 223 also include data detectors 221b, 222b and 223b for detecting data from the electrical signals converted by the photoelectric converters 221a, 222a and 223a, respectively.

The photoelectric converters 221a to 223a include elements, such as photodiodes, phototransistors, etc., which can convert light into electrical signals. A band pass filter, a wavelength selective filter, or an optical filter, which can selectively transmit only an optical signal at a corresponding wavelength, may be disposed between each photoelectric converter 221a, 222a or 223a and a corresponding optical transmitter 211, 212 or 213.

The controller 230 may be connected, through tap filters and the like, to paths through which data 1 to data 3 are input to the optical transmitters 211 to 213, in which the controller 230 divides a portion of each data, compares the powers of data 1 to data 3 with each other, and controls the output powers of the second light sources 211b to 213b in the optical transmitters 211 to 213.

Figure 4A:
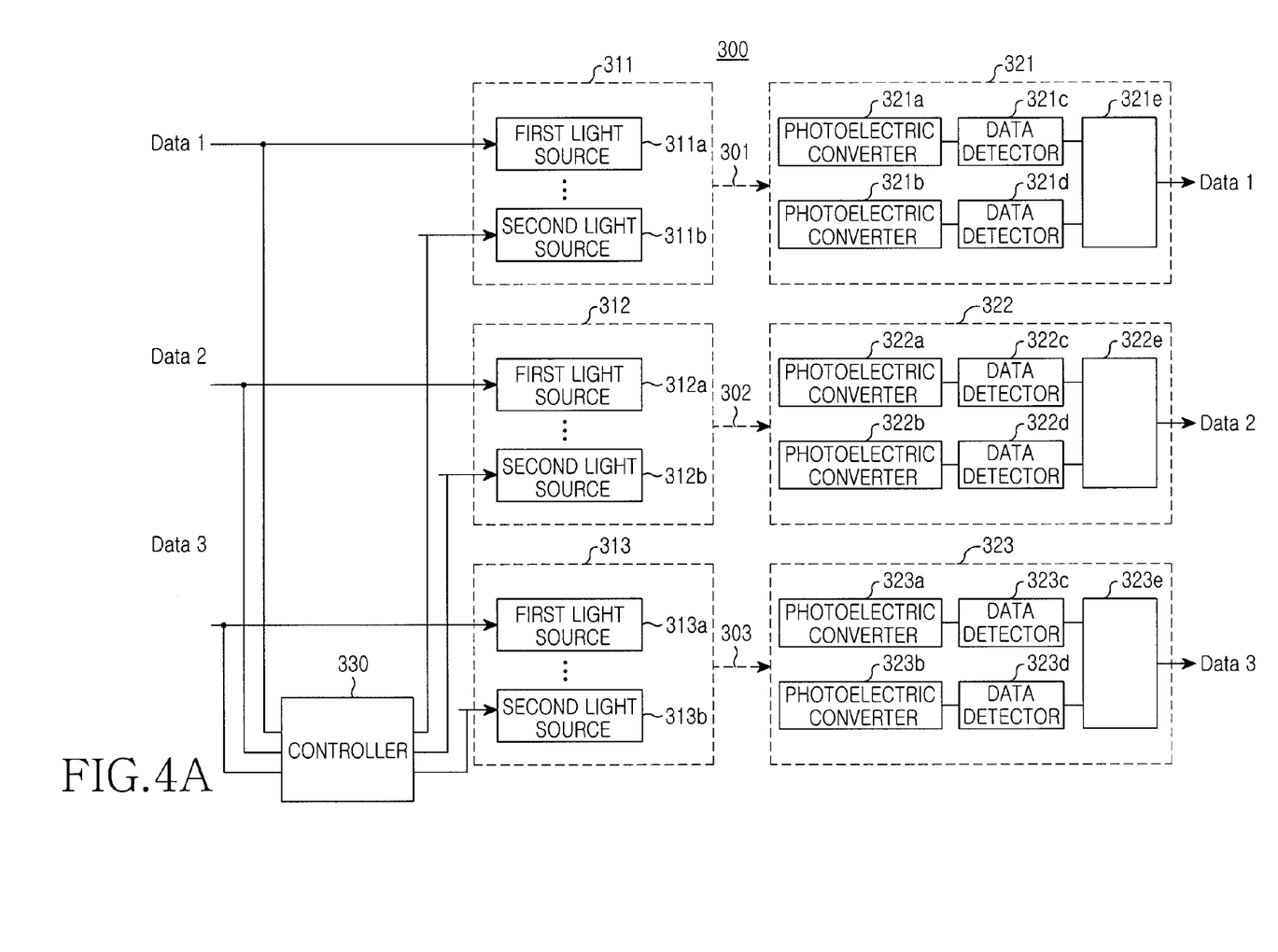
FIG. 4A is a block diagram illustrating a configuration of a wireless visible light communication system according to an exemplary embodiment of the present invention.
Figure 4B:
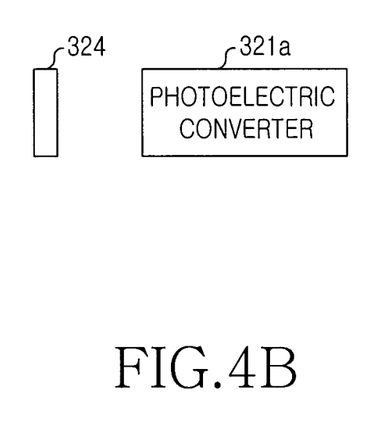
FIG. 4B is a block diagram illustrating an exemplary configuration of an optical receiver side shown in FIG. 4A.

FIG. 4A is a block diagram illustrating a configuration of a wireless visible light communication system according to an exemplary embodiment of the present invention, and FIG. 4B is a block diagram illustrating a part of an optical receiver side shown in FIG. 4A. A wireless visible light communication system 300 according to an exemplary embodiment of the present invention includes optical transmitters 311, 312 and 313 capable of generating optical signals and rays of light, which have different colors, optical receivers 321, 322 and 323 for detecting data 1, data 2 and data 3 from optical signals 301, 302 and 303 having corresponding colors and wavelengths, respectively, and a controller 330 for controlling each of the optical transmitters 311 to 313 to maintain light in the natural light state.

Each optical transmitter 311, 312 and 313 includes a first light source 311a, 312a and 313a for generating a data-modulated optical signal, and at least one second light sources 311b, 312b and 313b which generates light having substantially the same color as the first light source 311a, 312a and 313a and having a wavelength different from that of the first light source 311a, 312a and 313a in order to maintain light in the natural light state.

The wireless visible light communication system 300 according to an exemplary embodiment of the present invention includes the optical transmitters 311 to 313 which use red, blue and green light as carriers in order to maintain light in the natural light state. Therefore, in order to maintain the output powers of the optical transmitters 311 to 313 at a predetermined ratio, the optical transmitters 311 to 313 according to the exemplary embodiment of the present invention further includes separate second light sources 311b to 313b which generate light having substantially the same color as each corresponding optical signal and having a wavelength different from that of the corresponding optical signal.

The controller 330 detects each portion of data 1 to data 3 input from an exterior by means of a tap filter or the like, thereby being able to control each of the second light sources 311b to 313b by adjusting the ratio of the powers according to the data. The controller 330 may apply corresponding data to the second light sources 311b to 313b if necessary.

Each of the optical receivers 321 to 323 includes at least one of photoelectric converters 321a, 322a, 323a, 321b, 322b and 323b, at least one of data detectors 321c, 322c, 323c, 321d, 322d and 323d corresponding to the photoelectric converters 321a, 322a, 323a, 321b, 322b and 323b, respectively, and one of operation units 321e, 322e and 323e connected to the data detectors 321c, 322c, 323c, 321d, 322d and 323d.

An optical filter 324 for selecting a wavelength is disposed between each of the photoelectric converters 321a 322a, 323a, 321b, 322b, 323b and a corresponding optical transmitter 311 to 313. The optical filter 324 may include a band pass filter, a wavelength selective filter and so on.

According to an exemplary embodiment of the present invention, when data-modulated light is output from the second light sources, the optical receivers 321 to 323 convert the data-modulated light into electrical signals by means of corresponding photoelectric converters 321b to 323b and output the electrical signals to corresponding data detectors 321d to 323d. The operation units 321e to 323e can converge data detected by the data detectors 321c to 323c and 321d to 323d.

Figure 5:
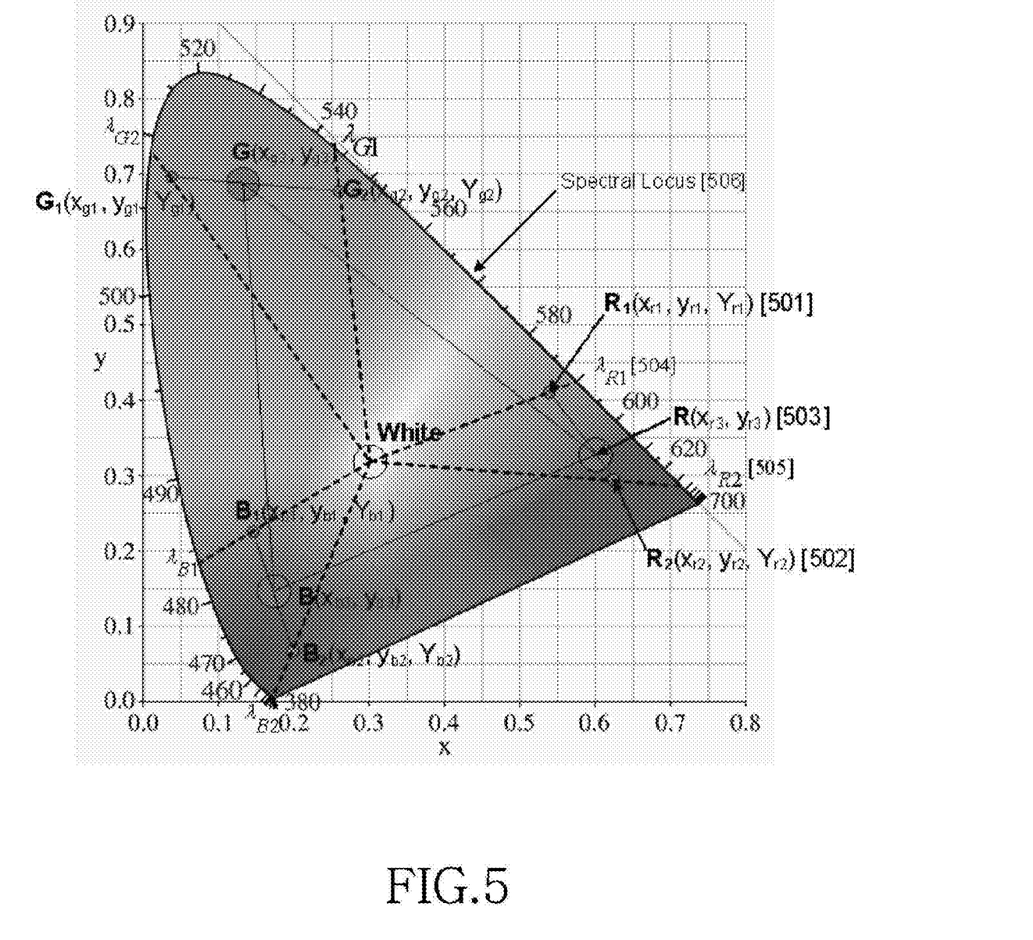
FIG. 5 is a chromaticity diagram explaining a wireless visible light communication system according to an exemplary embodiment of the present invention.
Figure 6:
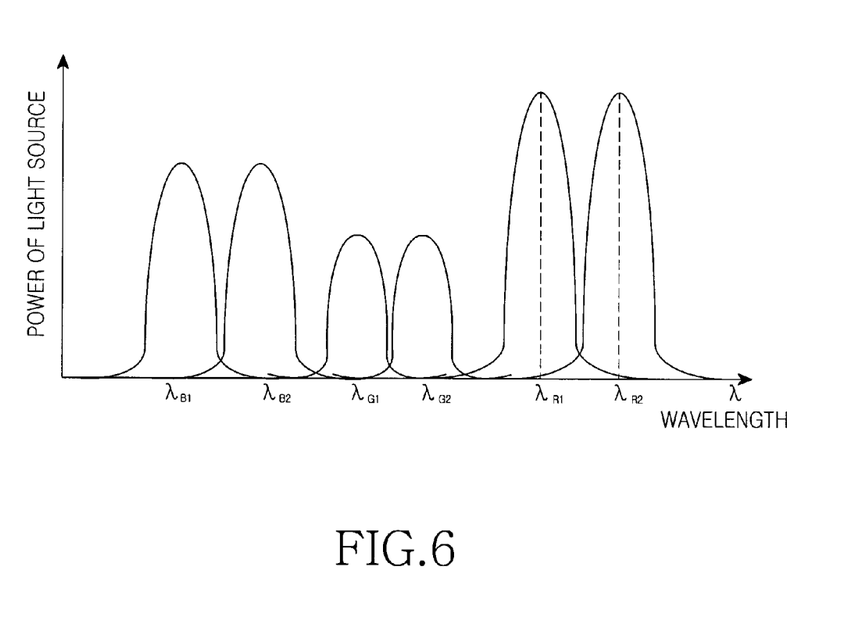
FIG. 6 is a graph illustrating outputs measured from optical transmitters according to an exemplary embodiment of the present invention.

FIG. 5 is a chromaticity diagram explaining a wireless visible light communication system according to an exemplary embodiment of the present invention, in which the chromaticity diagram refers to a graph obtained through quantification of the distribution of colors. FIG. 6 is a graph illustrating the outputs measured from optical transmitters according to an exemplary embodiment of the present invention, in which each optical transmitter generates fundamental light having a corresponding color as well as at least one ray of light having substantially the same color as the fundamental light and having a wavelength different from that of the fundamental light.

The chromaticity diagram shown in FIG. 5 refers to colorimetric rules defined in the general assembly of the Commission Internationale del'Eclairage (CIE) in 1931.

The chromaticity diagram quantitatively expresses every color with three factors, i.e., x, y, and Y, on the basis of values measured by a spectrophotometer. The "Y" is also called a photometric quantity and represents a value obtained through quantification of the brightness of color. The "x" and "y" represents a chromaticity in a pair. The chromaticity represents a color characteristic, other than the brightness of color, and indicates a point (i.e., coordinates) on the chromaticity diagram.

Natural light (or white light) may be implemented through a combination of three colors, i.e., red, blue and green, in which the three colors (i.e., red, blue and green) correspond to the coordinates of R ($x_{r3}$, $y_{r3}$), G ($x_{g3}$, $y_{g3}$), B ($x_{b3}$, $y_{b3}$) on the chromaticity diagram of FIG. 5.

The R ($x_{r3}$, $y_{r3}$) represents a sum of two rays of light having wavelengths of $\lambda_{R1}$ ($R_1$; $x_{r1}$, $y_{r1}$, $Y_{r1}$) and $\lambda_{R2}$ ($R_2$; $x_{r2}$, $y_{r2}$, $Y_{r2}$), respectively, in which according to an exemplary embodiment of the present invention, one of two wavelengths may correspond to a red light signal (i.e. a data-modulated optical signal generated from the first light source), and the other wavelength may correspond to red light (i.e. light generated from the second light source).

The G ($x_{g3}$, $y_{g3}$) represents a sum of two rays of light having wavelengths of $\lambda_{G1}$ ($G_1$; $x_{g1}$, $y_{g1}$, $Y_{g1}$) and $\lambda_{G2}$ ($G_2$; $x_{g2}$, $y_{g2}$, $Y_{g2}$), respectively, in which according to an exemplary embodiment of the present invention, one of two wavelengths may correspond to a green light signal (i.e. a data-modulated optical signal output from the first light source), and the other wavelength may correspond to green light (i.e. light generated from the second light source in order to maintain light in the natural light state).

The B ($x_{b3}$, $y_{b3}$) represents a sum of two rays of light having wavelengths of $\lambda_{B1}$ ($B_1$; $x_{b1}$, $y_{b1}$, $Y_{b1}$) and $\lambda_{B2}$ ($B_2$; $x_{b2}$, $y_{b2}$, $Y_{b2}$), respectively, in which according to an exemplary embodiment of the present invention, one of two wavelengths may correspond to a blue light signal (i.e. a data-modulated optical signal output from the first light source), and the other wavelength may correspond to blue light (i.e., light generated from the second light source in order to maintain light in the natural light state).

One of the optical transmitters according to an exemplary embodiment of the present invention outputs light corresponding to the R ($x_{r3}$, $y_{r3}$) of FIG. 5, and the other optical transmitters output light corresponding to the G ($x_{g3}$, $y_{g3}$) and B ($x_{b3}$, $y_{b3}$), respectively. That is, in order to uniformly maintain light in the natural light state by means of a combination of data-modulated optical signals having different colors, the wireless visible light communication system according to an exemplary embodiment of the present invention generates optical signals having red, blue, and green colors and rays of light which have substantially the same colors as the optical signals and have wavelengths different from those of the optical signals.

The controller according to an exemplary embodiment of the present invention calculates a ratio of brightness between wavelengths of each color, as shown in equation (1) below, which can be used to control the second light sources so as to maintain light corresponding to the coordinates of R ($x_{r3}$, $y_{r3}$), G ($x_{g3}$, $y_{g3}$) and B ($x_{b3}$, $y_{b3}$).

$$\alpha = \frac{x_{r1} - x_{r3}}{x_{r3} - x_{r2}} \quad (1)$$

Equation 1 represents a ratio α of powers between two rays of red light having wavelengths of $\lambda_{R1}$ ($R_1$; $x_{r1}$, $y_{r1}$, $Y_{r1}$) and $\lambda_{R2}$ ($R_2$; $x_{r2}$, $y_{r2}$, $Y_{r2}$), in which the ratio may be calculated by color coordinate values of light according to each wavelength. Equation 1 for red light may be equally applied to green light and blue light, as well.

Since an optical signal is usually determined according to data to be modulated, the controller identifies the power of the data, and can control the total amount of output light by controlling the second light source according to the identified power.

Figure 7A:
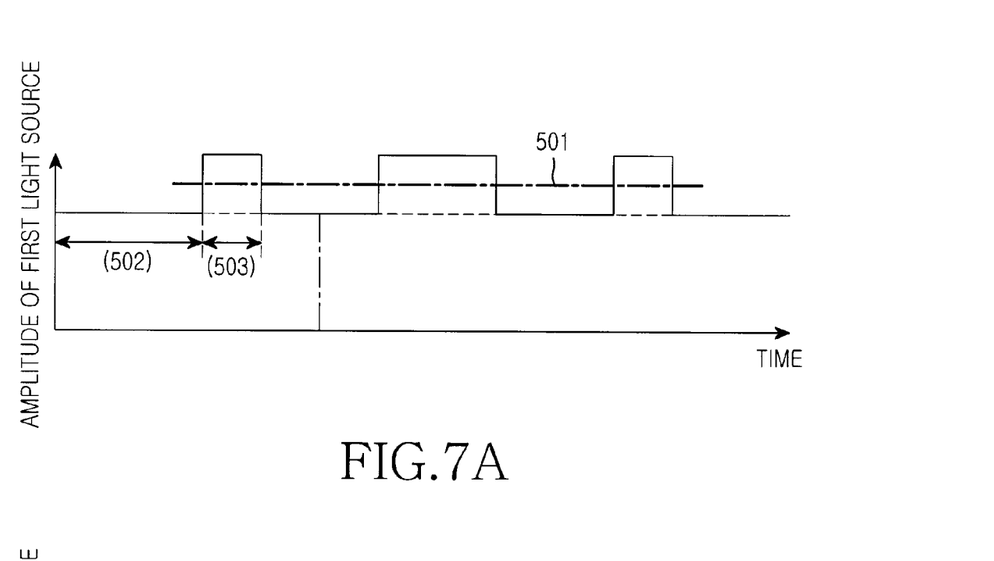
FIG. 7A and FIG. 7B are graphs explaining a data communication by a wireless visible light communication system according to an exemplary embodiment of the present invention.
Figure 7B:
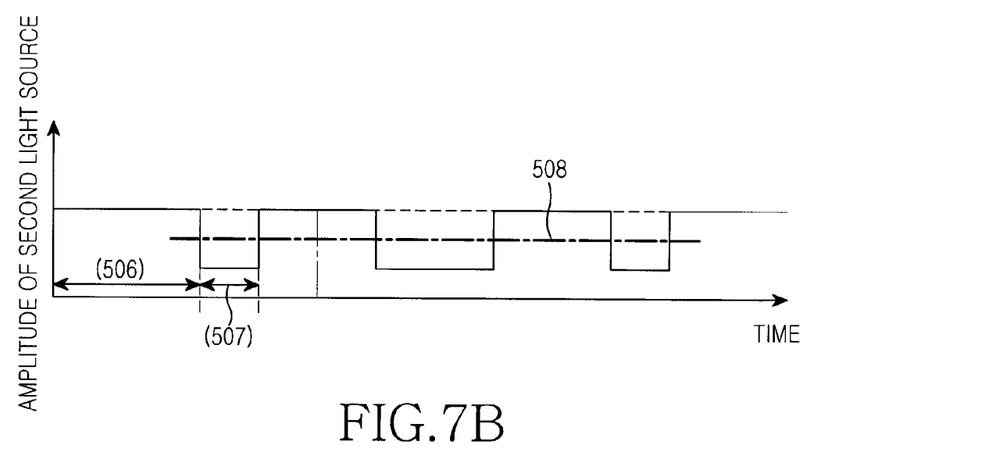

FIGS. 7A and 7B are graphs explaining a data communication of a wireless visible light communication system according to an exemplary embodiment of the present invention, in which an On-Off-Keying (OOK) modulation scheme is exampled.

FIGS. 7A and 7B illustrate amplitudes of signals output from an optical transmitter according to an exemplary embodiment of the present invention. The optical receiver side can determine whether a received optical signal is at an On level (e.g. 1) or an Off level (e.g. 0) corresponding to reference values 501 and 508.

Referring to FIG. 7A, it can be understood that there is a section 502, during which no data is transmitted. Also, referring to FIG. 7B, it can be understood that the second light source maintains a constant state during a section 506, which corresponds to the section 502 of FIG. 7A during which no data is transmitted.

In contrast, it can be understood that section 507 of FIG. 7B corresponding to a data transmission section 503 of FIG. 7A illustrates an inverse amplitude of that shown in the data transmission section 503. A pattern of amplitudes of light output upon transmission of an optical signal can be identified from FIGS. 7A and 7B.

As shown in FIG. 7A, the operation units 321e to 323e store a first reference value 501 for optical signals generated from the first light sources 311a to 313a and a second reference value 508 for the second light sources 311b to 313b, and can converge data detected from the data detectors 321c to 323c and 321d to 323d by comparing the data with the reference values and compensating the data.

The wireless visible light communication system according to an exemplary embodiment of the present invention additionally generates at least one ray of light having the substantially same color as a data-modulated optical signal and having a wavelength different from that of the data-modulated optical signal, so that it is possible to uniformly maintain light in the natural light state.

Also, the wireless visible light communication system according to an exemplary embodiment of the present invention can provide illumination for the user in an indoor environment or the like, and can minimize fatigue of the eyes of the user.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to specific exemplary embodiments thereof, it will be understood by those skilled in the art that various changes and modifications in form and details may be made therein without departing from the spirit and scope of the invention as defined by the appended claims and their equivalents.

What is claimed is:

1. A wireless visible light communication system comprising:
   a controller configured to control output powers of a plurality of optical transmitters configured to transmit optical signals to a plurality of optical receivers corresponding to the plurality of optical transmitters, respectively,
   wherein each of the plurality of optical transmitters comprises:
      a first light source configured to generate a first optical signal, having a first wavelength in the visible light spectrum, for transmitting data; and
      a second light source configured to generate a second optical signal, having a second wavelength in the visible light spectrum, the second wavelength being different from and a substantially similar color as the first wavelength and having a wavelength approximately 40-50 nm different from that of the first wavelength,
   wherein the plurality of optical transmitters generate first optical signals having mutually different colors,
   wherein each of the plurality of optical receivers is configured to receive the first optical signal from among the first and second optical signals outputted from a corresponding one of the plurality of optical transmitters,
   wherein a second amplitude pattern of the second optical signal has a shape obtained by inverting a first amplitude pattern of the first optical signal with respect to a reference value, and
   wherein each of the plurality of optical receivers is configured to detect a bit stream of logical ones and zeros from the first optical signal based on the reference value.

2. The system of claim 1,
   wherein the different colors comprise red, blue, and green.

3. The system of claim 1, wherein said each of the plurality of optical transmitters further comprises an external modulator for modulating the first optical signal generated by the first light source.

4. The system of claim 1, wherein each of the plurality of the optical receivers comprises:
   a wavelength selective filter for selectively transmitting an optical signal which is generated from the first light source and has a corresponding wavelength;
   a photoelectric converter for converting an optical signal transmitted through the wavelength selective filter into an electrical signal; and
   a data detector for detecting data from the electrical signal converted by the photoelectric converter.

5. The system of claim 1, wherein the first and second light sources of each optical transmitter use a complementary modulation scheme such that a sum of amplitudes of the first and second optical signals is maintained to be a constant predetermined value,
- wherein the controller controls powers of the optical transmitters by adjusting a ratio of powers of the light sources according to their respective colors, and
- wherein the wavelengths and output powers are selected and controlled so as to uniformly maintain emitted light in a constant natural light state.

* * * * *